United States Patent
Quan et al.

(10) Patent No.: US 9,437,225 B2
(45) Date of Patent: Sep. 6, 2016

(54) READER DESIGNS OF SHIELD TO SHIELD SPACING IMPROVEMENT

(71) Applicant: Headway Technologies, Inc., Milpitas, CA (US)

(72) Inventors: Junjie Quan, Fremont, CA (US); Kunliang Zhang, Fremont, CA (US); Min Li, Fremont, CA (US); Ruhang Ding, Pleasanton, CA (US); Yewhee Chye, Hayward, CA (US); Glen Garfunkel, San Jose, CA (US); Wenyu Chen, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 140 days.

(21) Appl. No.: 14/445,167

(22) Filed: Jul. 29, 2014

(65) Prior Publication Data

US 2016/0035378 A1 Feb. 4, 2016

(51) Int. Cl.
*G11B 5/127* (2006.01)
*G11B 5/39* (2006.01)

(52) U.S. Cl.
CPC ............ *G11B 5/3912* (2013.01); *G11B 5/127* (2013.01); *G11B 5/3909* (2013.01); *G11B 5/3929* (2013.01); *G11B 2005/3996* (2013.01)

(58) Field of Classification Search
CPC ........... G11B 5/127; G11B 5/33; G11B 5/48; G11B 5/39
USPC ................ 360/324.12, 324.1, 324.2, 324.11
See application file for complete search history.

(56) References Cited

U.S. PATENT DOCUMENTS

| 7,952,839 B2 | 5/2011 | Yamazaki et al. |
| 8,582,249 B2 | 11/2013 | Sapozhnikov et al. |
| 2009/0251829 A1* | 10/2009 | Zhang .............. B82Y 10/00 360/319 |
| 2010/0177449 A1* | 7/2010 | Zhao .............. B82Y 10/00 360/324.12 |
| 2012/0070693 A1* | 3/2012 | Abarra .............. B82Y 10/00 428/811.2 |
| 2013/0027032 A1 | 1/2013 | Gao et al. |

OTHER PUBLICATIONS

Co-pending US Patent HT12-026, U.S. Appl. No. 13/803,362, filed Mar. 14, 2013, "A Reader Sensor Stucture and Its Method of Construction," by Min Li, et al.,39 pgs.

* cited by examiner

*Primary Examiner* — Allen T Cao
(74) *Attorney, Agent, or Firm* — Saile Ackerman LLC; Stephen B. Ackerman

(57) ABSTRACT

A MR sensor is disclosed with an antiferromagnetic (AFM) layer recessed behind a first stack of layers including a free layer and non-magnetic spacer to reduce reader shield spacing and enable increased areal density. The AFM layer may be formed on a first pinned layer in the first stack that is partially embedded in a second pinned layer having a front portion at an air bearing surface (ABS) to improve pinning strength and avoid a morphology effect. In another embodiment, the AFM layer is embedded in a bottom shield and surrounds the sidewalls and back side of an overlying free layer in the sensor stack to reduce reader shield spacing. Pinning strength is improved because of increased contact between the AFM layer and a pinned layer. The free layer is aligned above a bottom shield center section.

41 Claims, 12 Drawing Sheets

READER DESIGNS OF SHIELD TO SHIELD SPACING IMPROVEMENT

RELATED PATENT APPLICATIONS

This application is related to U.S. Pat. No. 7,952,839, and Ser. No. 13/803,362, filing date Mar. 14, 2013; assigned to the same assignee and herein incorporated by reference in their entirety.

TECHNICAL FIELD

The present disclosure relates to a read head in which shield to shield spacing is reduced by moving an antiferromagnetic (AFM) layer behind the free layer to avoid exposing the AFM layer at an air bearing surface (ABS) plane, or to embed the AFM layer within the bottom shield thereby reducing the thickness of the sensor stack for high areal density applications.

BACKGROUND

As the data areal density in hard disk drives (HDD) continuously increases because of technology improvements, the magnetoresistive (MR) sensor that is used as the read-back element in HDD is required to have increasingly better spacial resolution while maintaining a reasonable signal-to-noise ratio (SNR). The sensor is a critical component in which different magnetic states are detected by passing a sense current through the sensor and monitoring a resistance change. A common giant magnetoresistive (GMR) configuration includes two ferromagnetic layers that are separated by a non-magnetic spacer in the sensor stack. One of the ferromagnetic layers is a pinned layer wherein the magnetization direction is fixed by exchange coupling with an adjacent anti-ferromagnetic (AFM) pinning layer. The second ferromagnetic layer is a free layer wherein the magnetization vector can rotate in response to external magnetic fields and is aligned either parallel or anti-parallel to the magnetization in the pinned layer. The spacer may be a conductive metal such as Cu in a giant magnetoresistive (GMR) device, or a dielectric layer in a tunneling magnetoresistive (TMR) sensor.

Referring to FIG. 1a, a portion of a conventional read head 8 is shown wherein a sensor element 6 is formed between a top shield 2 and bottom shield 1, and between hard bias structures 4 that are positioned on opposite sides of the sensor. Hard bias structures 4 with a longitudinal magnetization 5 provide a biasing magnetic field on the sides of the sensor to orientate the free layer magnetization 110 (FIG. 1b) in the y-axis direction or in-plane direction. There is an insulation layer 7 to separate the sensor 6 from hard bias structures 4. The thickness of the sensor element is also referred to as the reader shield (shield to shield) spacing (RSS) 3. As sensor size becomes smaller in a cross-track direction to achieve higher areal density, it is critical to also reduce the RSS spacing (down-track direction) in order to improve bit error rate (BER).

In FIG. 1b, a conventional sensor element 6 is shown with a bottom spin valve configuration that typically has a seed layer 101, AFM layer 102, pinned layer 103, spacer 104, free layer 105 having a magnetization direction 110, and a capping layer 106 that are sequentially formed on the bottom shield (not shown). Current efforts to further increase areal data density involve developing a greater data linear density along a down-track (z-axis) direction and a higher track density along the cross-track (y-axis) direction. The AFM layer, which provides bias to the pinned layer magnetization and high temperature stability, is generally one of the thickest layers in the sensor stack. Therefore, it is difficult to reduce RSS spacing without modifying the AFM design. We have previously disclosed a scheme that places a recessed AFM layer behind the ABS plane in U.S. Pat. No. 7,952,839. According to this configuration, the AFM layer is embedded in the bottom shield without exposure to the ABS and therefore reduces RSS spacing. However, this recessed AFM design is also associated with some concerns such as shield stability near the sensor, and a morphology effect on the pinned layer that may have a well known synthetic antiferromagnetic (SyAF) structure with a antiferromagnetic coupling layer formed between two magnetic layers.

One skilled in the art also recognizes that reducing RSS spacing 3 in FIG. 1a usually means the thickness of hard bias structure 4 must decrease accordingly. As a result, a thinner hard bias structure 4 may lead to a weaker pinning field on edges of free layer 105 (FIG. 1b) and thereby yield a less stable sensor 6. Meanwhile, magneto-static coupling between the hard bias structure and top shield 2 may become greater as RSS spacing decreases which can easily cause a rotation of hard bias magnetization 5 away from a longitudinal direction in the proximity of free layer. Thus, modification of the AFM layer and hard bias layers surrounding the sensor must be carefully designed in order to avoid degrading the desired properties of the sensor stack layers and hard bias structure.

To overcome the shortcomings of the prior art and to achieve a high performance sensor with reduced RSS spacing that is compatible with high data area density devices of >1 Tb/inch$^2$, an improved read head design is needed.

SUMMARY

One objective of the present disclosure is to provide a read head shield and MR sensor structure wherein reader shield to shield spacing is reduced to enable higher areal density devices.

A second objective of the present disclosure is provide a MR sensor structure according to the first objective such that there is no morphology effect on the pinned layer caused by AFM layer modifications.

A third objective of the present invention is to provide an improved MR sensor design with reduced RSS spacing and wherein bias from the AFM layer occurs from a position on a side of and from behind the free layer to improve pinning strength with the pinned layer.

These objectives are achieved according to one embodiment in which a first stack of layers including a seed layer, pinned layer, non-magnetic spacer, free layer, and first capping layer are sequentially formed on a bottom shield in a MR read head, and each of the aforementioned layers has a front side at an air bearing surface (ABS). There are two sidewalls along the first stack of layers at the ABS that define a track width. For the non-magnetic spacer, free layer, and first capping layer in the upper portion of the first stack, the two sidewalls extend a first distance (first stripe height) in a direction that is perpendicular to the ABS and toward a back end of the MR sensor. However, the sidewalls along a bottom portion of the first stack including the seed layer and pinned layer extend a second distance (second stripe height) that is greater than the first stripe height. In one aspect, the pinned layer has a first magnetic layer (RL) contacting the seed layer, a second magnetic layer (PL2) contacting the non-magnetic spacer, and an antiferromagnetic coupling layer therebetween.

From a down-track cross-sectional view, there is a first isolation (dielectric) layer along a back side of the layers of the upper portion in the first stack, and on a front portion of the PL2 layer adjacent to the non-magnetic spacer back side. A second stack of sensor layers including a pinned layer (PL1), AFM layer, and second capping layer are sequentially formed on a back portion of the PL2 layer that is greater than a first stripe height from the ABS. The second stack has a front side facing the ABS and contacting the first isolation layer, and two sidewalls that extend to a back side and thereby form a trapezoidal shape from a top-down view wherein the front side has a smaller cross-sectional width than the back side. Optionally, the second stack may have a rectangular shape from a top-down perspective. The front side of the second stack preferably has a greater cross-sectional width than that of the upper portion of the first stack. The first stack may have a substantially rectangular shape from the top-down view. Preferably, a back side of the second stack is formed along the same vertical plane as the back side of the lower portion of the first stack.

The first isolation layer forms a first gap distance between the upper portion of the first stack and the front side of the second stack. In one embodiment, a bottom portion of the PL1 layer is embedded in a top portion of the PL2 layer so that there is greater contact between PL1 and PL2 layers. As a result, a top surface of the second capping layer may be formed closer to the bottom shield than a top surface of the first capping layer. A top shield is formed above both of the first stack and the second stack such that a top surface of the first capping layer contacts the top shield while the second stack is separated from the top shield by a portion of the first isolation layer that extends to a back side of the second stack of layers.

According to the second embodiment, the first stack of layers is modified such that the bottom portion has a first width in a cross-track direction that is greater than the track width in the upper portion. Thus, a first set of sidewalls define a track width along the non-magnetic spacer, free layer, and first capping layer at the ABS and has a first stripe height while a second set of sidewalls is formed along the bottom portion and has a second stripe height. The bias structure is only formed adjacent to the first set of sidewalls so that a bias can be applied to the free layer.

According to a third embodiment that represents a modification of the first embodiment, all layers in the first stack of layers are retained. However, the first isolation layer and second stack are replaced by a third stack including an oxide layer such as NiO that also functions as a AFM layer, and an uppermost second capping layer that contacts a bottom surface of the top shield. In this case, the third stack extends from the back side of the free layer to the vertical plane at the second stripe height from the ABS. The PL1 layer may be omitted such that the oxide AFM layer contacts a top surface of the PL2 layer behind the non-magnetic spacer. Moreover, a bottom portion of the oxide AFM layer may be embedded in a top portion of the PL2 layer that is formed greater than a first stripe height distance from the ABS.

In a fourth embodiment that is referred to as an extended embedded AFM design, the seed layer and overlying AFM layer are embedded in the bottom shield at the ABS on either side of a bottom shield center section such that a top surface of a first seed layer/AFM stack and a top surface of a second seed layer/AFM stack are coplanar with a top surface of the bottom shield center section. The seed layer and AFM layer extend a second distance from the ABS to a back side of a SyAF pinned layer that is formed on a top surface of the seed layer/AFM stacks and on a top surface of the center section of bottom shield. There is a PL1 layer that is formed on each AFM layer and with a cross-track width equivalent to that of an AFM layer. Between the two PL1 layers is a seed layer with a top surface that is coplanar with a top surface of the PL1 layers along a first plane. A SyAF pinned layer with a PL2/coupling layer/RL configuration is formed on the first plane. The SyAF pinned layer has a first width in a cross-track direction and there is a second set of sidewalls extending along each PL1 layer and the SyAF pinned layer to a second stripe height similar to the lower portion of the first stack in the second embodiment. A first stack of layers comprising a lower non-magnetic spacer, free layer, and upper capping layer is formed on a center portion of the SyAF layer above the bottom shield center section. The first stack has a track width at the ABS and has a first set of sidewalls extending a first stripe height from the ABS similar to the upper portion of the first stack in the second embodiment.

A key feature is that the first seed layer/AFM stack is connected to the second seed layer/AFM stack behind the first stack of layers such that there is a continuous seed layer/AFM stack of layers along both first sidewalls of the second stack and behind a back side of the second stack to improve pinning strength. Furthermore, the SyAF layer completely covers the AFM layer to provide greater pinning strength. The center section of bottom shield preferably has a cross-track width greater than a track width of the overlying free layer.

Although the aforementioned embodiments relate to bottom spin valve configurations where the free layer is formed above the reference layer in the MR sensor stack, the present disclosure also includes top spin valve structures where the AFM layer is recessed behind the free layer, and the free layer is positioned below the reference layer and pinned layers.

The present disclosure also encompasses a process sequence for fabricating an embedded AFM design of the first three embodiments. A second process sequence is provided for fabricating a sensor with an extended embedded AFM design.

BRIEF DESCRIPTION OF THE DRAWINGS

FIGS. 4a-4f are down-track cross-sectional views showing a process sequence for fabricating the sensor with an embedded AFM design shown in FIG. 3a.

DETAILED DESCRIPTION

The present disclosure is a magnetoresistive (MR) read head in which a sensor stack has reduced shield to shield spacing as a result of recessing the AFM layer behind the free layer with respect to the ABS. In other embodiments, the AFM layer forms a continuous layer (stripe) along the sidewalls and back side of a stack that includes the free layer, and is completely covered by the pinned layer to improve pinning strength and sensor stability. In all drawings, the y-axis is the cross-track direction where distance is expressed as a width, the z-axis is the down-track direction where distance is expressed as a thickness, and the x-axis is a direction orthogonal to the ABS and toward a back side of the read head where distance is expressed as stripe height or "height". The terms "isolation" and "insulation" may be used interchangeably when referring to the function of a dielectric material or layer placed between adjacent magnetic or metal layers.

Figure 1A:
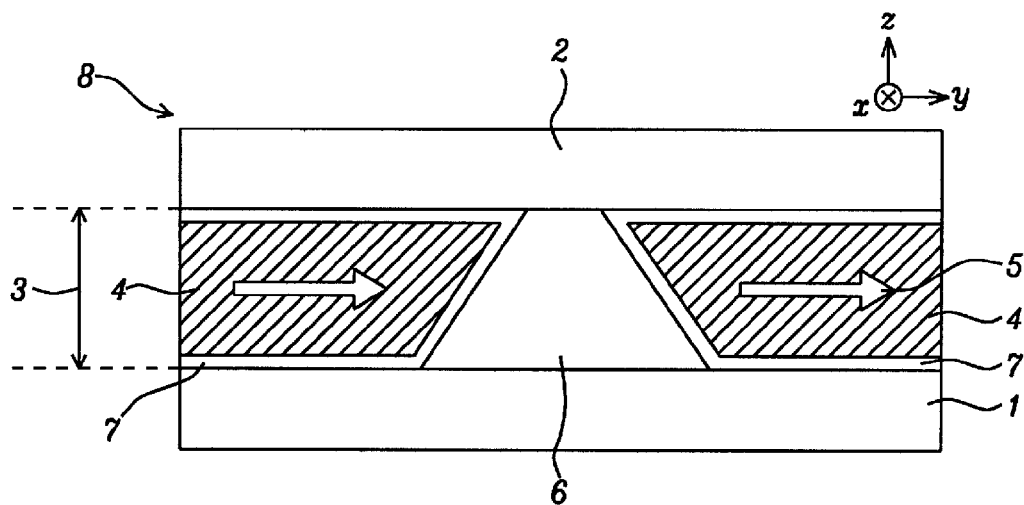
FIG. 1a is a cross-sectional view showing a conventional read head where hard bias layers provide longitudinal bias to stabilize a free layer in a sensor element.
Figure 1B:
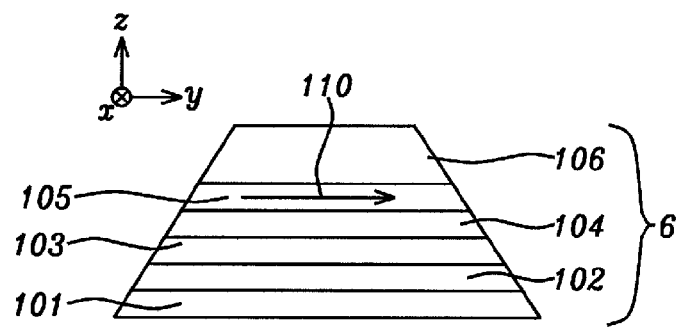
FIG. 1b is an enlarged view of the sensor in FIG. 1a and shows a free layer with magnetization that is stabilized in an in-plane direction.
Figure 2A:
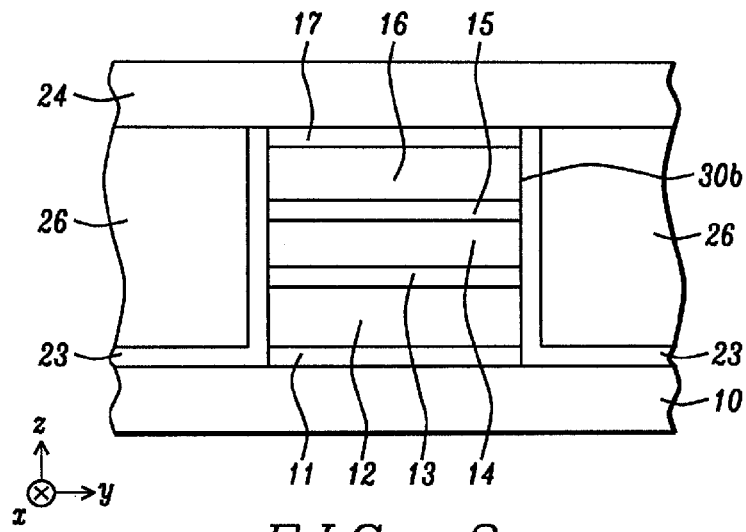
FIG. 2a is an ABS view of an embedded AFM design of the present disclosure where the AFM layer is recessed behind the free layer.
Figure 3A:
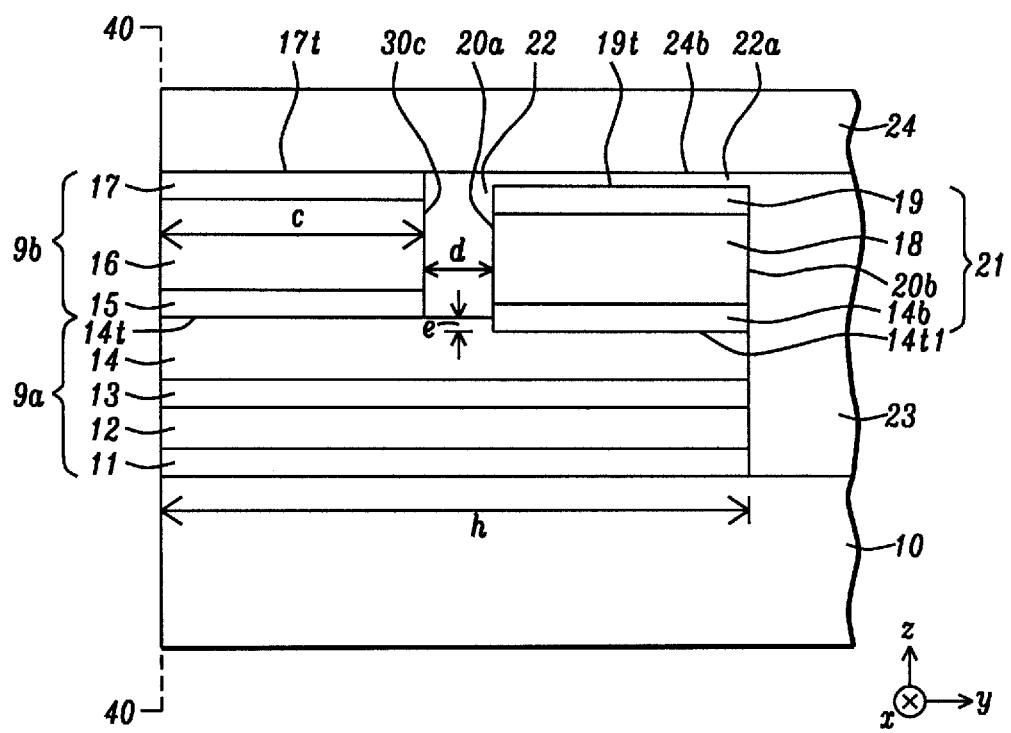
FIGS. 3a-3b are down-track cross-sectional views showing two embodiments of an embedded AFM sensor design in FIG. 2a where the AFM layer is offset behind the free layer and is formed above a pinned layer.

According to a first embodiment of the present disclosure that is illustrated by an ABS view in FIG. 2a, an AFM layer (not shown in this view) is recessed behind a free layer in a MR sensor stack of layers. Moreover, an additional pinned layer (PL1) as shown in FIG. 3a is included to provide improved pinning strength between the AFM layer and a PL2 pinned layer where PL2 is part of a synthetic antiferromagnetic (SyAF) layer that includes a reference layer (RL) and a coupling layer. It should be understood that the PL1 pinned layer may be a single layer or a SyAF pinned layer with two magnetic layers separated by an antiferromagnetic coupling layer. Also, the PL1 pinned layer is coupled directly to the PL2 pinned layer such that the pinned layers have a magnetization in the same direction.

With regard to FIG. 2a, a portion of a read head is depicted from an ABS view. There is a bottom (S1) shield 10 made of a magnetic material that is typically an alloy of two or more of Co, Fe, and Ni. According to one embodiment that represents a bottom spin valve configuration, a seed layer 11, reference layer 12, antiferromagnetic coupling layer 13, PL2 pinned layer 14, non-magnetic spacer 15, free layer 16, and capping layer 17 are sequentially formed on the bottom shield. When the non-magnetic spacer is a metal such as Cu, the stack of layers 11-17 is considered to be a GMR sensor. In other embodiments where the non-magnetic spacer is a dielectric layer such as a metal oxide, layers 11-17 are said to form a TMR sensor. Hereafter, the stack of layers 11-17 will be referred to as a MR sensor to encompass both GMR and TMR sensor structures.

Seed layer 11 may be comprised of one or more of Ta, Ru, Ti, Cu, TaN, NiCr, NiFeCr, CrTi, or may be other seed layer materials used in the art. Reference layer 12 and PL2 pinned layer 14 are generally Co, Fe, CoFe, or alloys thereof and may include one or more additional elements such as B and Ni. In other embodiments, one or both layers 12, 14 may be comprised of a laminated stack $(A1/A2)_n$ where A1 is Co or an alloy thereof, A2 is Co or an alloy thereof, and n is a lamination number $\geq 1$. When a laminated stack $(A1/A2)_n$ is used for the PL2 pinned layer, a transition layer (not shown) such as Co, CoFe/Co, or CoFeB/Co may be deposited on the uppermost A2 layer to improve the lattice transition between the PL2 pinned layer and the non-magnetic spacer 15. The present disclosure also anticipates that one or both layers 12, 14 may be comprised of Co and Pt as in a L10 alloy or a $(Co/Pt)_n$ or $(Co/Pd)_n$ laminate. Other magnetic materials not mentioned above may also be employed as the reference layer and pinned layer since the benefits of the recessed AFM designs described herein are independent of the SyAF pinned layer composition. The coupling layer 13 is preferably Ru but may be other materials such as Rh or Ir that enable efficient antiferromagnetic coupling between the reference layer and PL2 pinned layer. Non-magnetic spacer 15 may be a metal, a dielectric layer that is a metal oxide or a laminated stack of metal oxide layers, or a composite that includes one or more metal layers and one or more metal oxide layers such as Cu/MgO/Cu or MgO/Cu/MgO. In another embodiment, the non-magnetic spacer has a well known confining current pathway (CCP) configuration wherein metal pathways are formed in a metal oxide matrix.

Above the non-magnetic spacer is a free layer 16 that may be a single magnetic layer or a composite with a plurality of magnetic layers having either in-plane or perpendicular magnetic anisotropy (PMA). In other embodiments, the free layer may be an $(A1/A2)_n$ laminate with PMA as described earlier. Furthermore, a non-magnetic insertion layer such as Ta may be formed between two magnetic layers in the free layer stack. Each of the one or more magnetic layers in the free layer may be comprised of one or more of Co, Fe, Ni, and in some embodiments may include a non-magnetic amorphous element such as B, Zr, Hf, or Nb. In general, the free layer composition is selected to enable a large (dR/R) ratio where R is the resistance of the MR sensor and dR is the change in resistance when an electrical "sense" current is applied in a read process. A higher MR ratio (dR/R) means a faster readout of the MR sensor's magnetic state. Magnetic layers with PMA may be employed to increase the thermal stability of the free layer.

In one aspect, capping layer 17 is comprised of one or more metal layers including Ta, and Ru although other non-magnetic layers used in the art are acceptable. In an alternative embodiment, the capping layer may have a CCP configuration as described previously, or is a metal oxide such as MgO, TiOx, HfOx, or $Al_2O_3$, or laminates of one or more of the aforementioned metal oxides. However, in this case, capping layer thickness is typically limited to less than 20 Angstroms in order to maintain the resistance x area (RA) value within a desired range. Preferably, the capping layer contacts the top shield 24 to provide an electrical connect for a sense current (not shown) to flow between the top shield and bottom shield during a read operation.

Sidewalls 30b are formed along the sides of each layer in the MR sensor stack. Although the exemplary embodiments depict vertical sidewalls, the sidewalls may also be sloped such that seed layer 11 has a greater width in a cross-track direction than capping layer 17. An isolation layer 23 that is made of a dielectric material is preferably formed along sidewalls 30b and on a top surface of bottom shield 10 that is adjacent to the sidewalls. The insulation layer is used to separate hard bias layers 26 from the free layer 16. Materials suitable to form a hard bias layer include CoPt, CoCrPt, FePt, NiFe, and the like. Preferably, top surfaces of the hard bias layers and capping layer form a substantially planar surface so that a uniformly thick top shield 24 may be formed thereon.

Figure 2B:
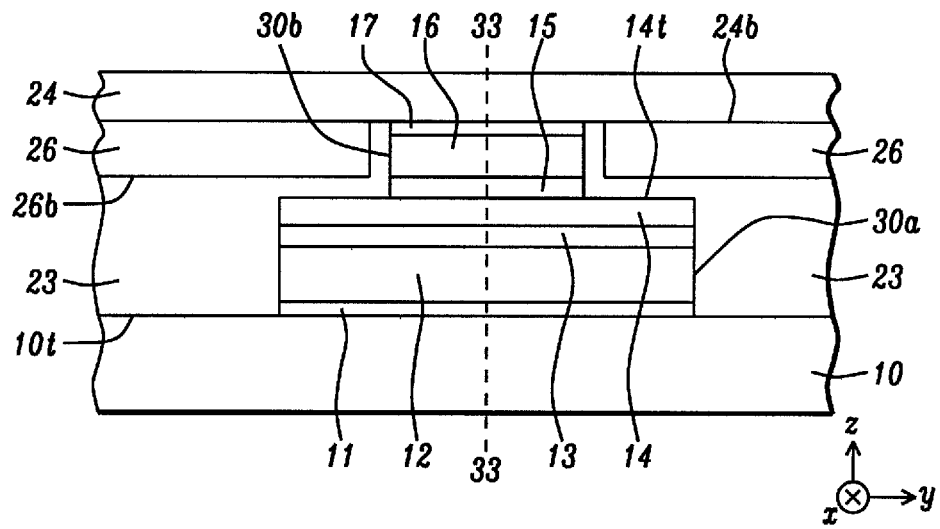
FIG. 2b is an ABS view of a second embodiment of the present disclosure where the SyAF pinned layer has a greater cross-track width than the free layer in the embedded AFM design.

FIG. 2b illustrates an alternative MR sensor structure from an ABS view where all layers are retained from FIG. 2a except the non-magnetic spacer 15, free layer 16, and capping layer are patterned in a separate process sequence than the lower layers 11-14 and thereby have a smaller width in a cross-track direction than the seed layer 11 and SyAF structure with layers 12-14. As a result, the hard bias layers 26 may be formed adjacent only to the upper layers 15-17, and above a top surface 14t of PL2 layer 14. As explained later, an upper section of isolation layer 23 that is formed above top surface 14t and along sidewalls 30b may be deposited after a bottom section of the isolation layer that is along sidewalls 30a. The upper and lower sections (not shown) may be comprised of the same material and are therefore considered to be a single isolation or insulation layer.

In FIG. 3a, a down-track cross-sectional view is taken along a plane 33-33 (FIG. 2a or FIG. 2b) that is orthogonal to the ABS 40-40 and bisects layers 11-17 in the MR sensor. Layers 11-14 are hereafter called "first stack 9a" and have a first stripe height h, and layers 15-17 are hereafter called "second stack 9b" and have a second stripe height c that is less than the first stripe height. The MR sensor further comprises a third stack of layers 21 that is formed behind the second stack and includes a lower PL1 pinned layer 14b, an antiferromagnetic (AFM) layer 18, and a second capping layer 19 wherein the third stack is recessed a distance d behind a back side 30c of the second stack. Note that an insulation layer also referred to as isolation layer 22 that is made of a dielectric material preferably fills the gap between back side 30c of the second stack and front side 20a of the third stack, and extends in a thickness direction from top surface 14t to bottom surface 24t of the top shield 24. Thus, the third stack has a height in the x-axis direction equal to [h<(c+d)] since the first stack and third stack preferably share a common back side 20b that is formed along a vertical plane in a down-track direction. The PL1 pinned layer is included between PL2 pinned layer 14 and AFM layer 18 in order to improve pinning strength and thereby increase stability of the PL2 pinned layer magnetization (not shown). Since the AFM layer is formed above the PL1 and PL2 pinned layer, there is no detrimental effect of AFM roughness on pinned layer morphology. Moreover, AFM layer 18 is recessed behind the free layer and does not contribute to RSS spacing between shields 10, 24 at the ABS.

In the exemplary embodiment, PL1 pinned layer 14b is partially embedded in and directly coupled to the PL2 pinned layer 14 such that a top surface 14t of a front portion of the first stack with stripe height (c+d) is formed a vertical distance e of up to about 20 Angstroms above a top surface 14t1 of a back portion of the first stack that is formed below the third stack 21. Preferably, a top surface 19t of capping layer 19 in the third stack is separated from top shield 24 by insulation layer 22a to electrically isolate AFM layer 18 from the top shield. PL1 pinned layer is selected from the same group of materials that are employed for the PL2 pinned layer. AFM layer 18 may be one of MnPt, IrMn, NiMn, OsMn, RuMn, RhMn, PdMn, RuRhMn, or MnPtPd. Capping layer 19 may be identical in composition to that of capping layer 17 or may be another capping layer material used in the art.

Figure 3B:
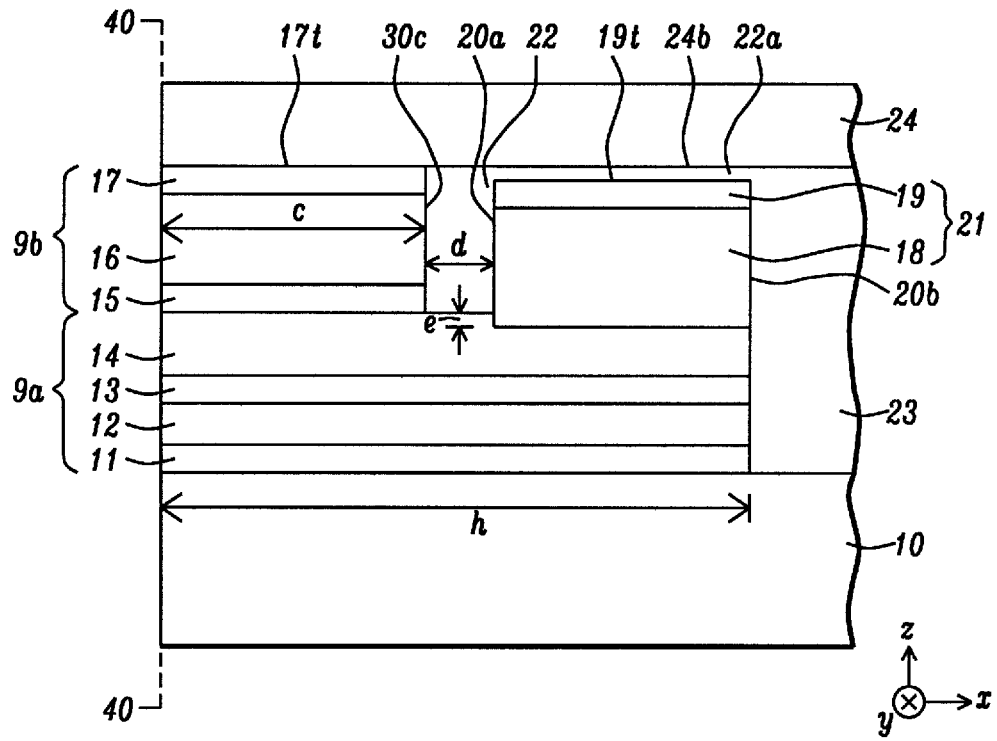

According to another embodiment illustrated in FIG. 3b, the MR sensor with first stack 9a and second stack 9b is retained from FIG. 3a except the PL1 pinned layer is omitted and AFM layer 18 is embedded in the PL2 pinned layer by up to a distance e to improve pinning strength. As a result, third stack 21 is reduced from three to two layers. Preferably, a top surface 19t of capping layer 19 is separated from top shield 24, the first stack and third stack share a common back side 20b, and the front side 20a of third stack is separated by isolation layer 22 from a back side 30c of the second stack by a distance d of up to 50 nm.

Figure 3C:
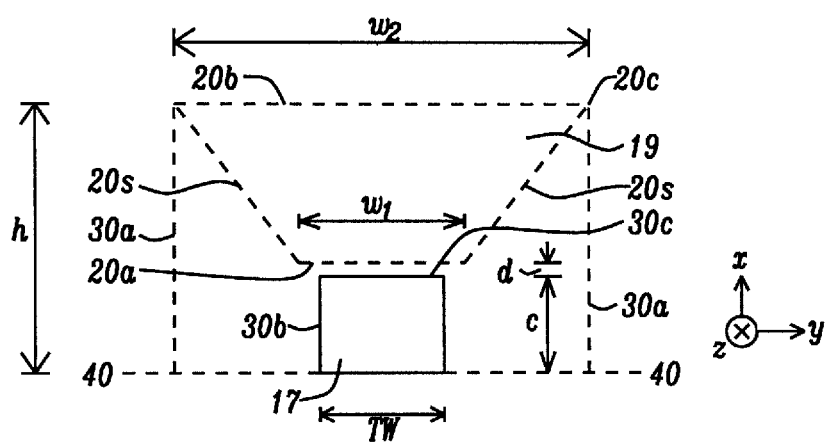
FIG. 3c is a top-down view of the embedded AFM design in FIG. 3b where the top shield has been removed.

In FIG. 3c, a top-down view is shown of the MR sensor in FIG. 3b with the top shield removed. The second stack with uppermost capping layer 17 has sidewalls 30b extending a second stripe height c, and has a track width TW at the ABS 40-40. First stack is out of view below the second stack but first stack sidewalls 30a with stripe height h are depicted by dashed lines to indicate the overlay of second stack on first stack. According to one embodiment, sidewalls 30a intersect the back side 20b of the third stack at corners 20c such that the third stack and first stack have an equivalent cross-track width w2. However, other embodiments are anticipated where the width w2 between sidewalls 30a is greater than or less than the cross-track width of third stack back side 20b. Although a trapezoidal shape is shown for the third stack where front side 20a has a smaller cross-track width w1 than back side 20b, other third stack shapes are acceptable including a rectangular shape where w1=w2. Gap distance d is shown between second stack back side 30c and third stack front side 20a. In yet another embodiment, front side 20a may be aligned below the first stack so that second stack back side is a greater distance from the ABS than the third stack front side.

The embodiments depicted in FIG. 2a-FIG. 3c are referred to as AFM refill structures and the process flow for forming the FIG. 2b structure differs from that of FIG. 2a primarily because the first stack and second stack sidewalls are defined in one patterning and etching sequence in FIG. 2a, and with two patterning and etching sequences in FIG. 2b. The present disclosure also encompasses a method of fabricating an AFM refill structure. FIGS. 4a-4f are shown and indicate a series of process steps for forming the AFM refill structure in FIG. 3a.

Figure 4A:
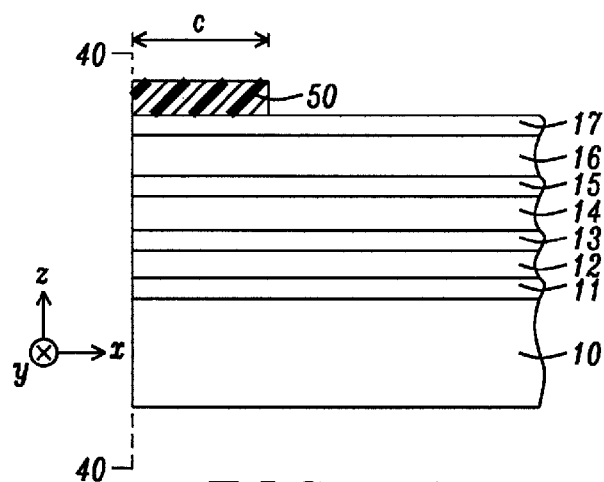

Referring to FIG. 4a, seed layer 11, reference layer 12, coupling layer 13, PL2 pinned layer 14, non-magnetic layer 15, free layer 16, and capping layer 17 are sequentially laid down on bottom shield 10. For example, the MR sensor layers may be formed in an Anelva C-7100 thin film sputtering system or the like which typically includes three physical vapor deposition (PVD) chambers each having multiple targets, an oxidation chamber, and a sputter etching chamber. According to one embodiment, sidewalls 30b (FIG. 2a) may be formed by a conventional process before the process step shown in FIG. 4a begins, or the sidewalls may be formed following the process step in FIG. 4f. Assuming the latter option is employed, the process flow comprises a first patterning step in FIG. 4a where a first photoresist layer is coated on a top surface of the capping layer and is patternwise exposed to yield a photoresist masking layer 50 that extends a first stripe height distance c from the eventual ABS plane 40-40. It should be understood that the ABS is not defined until a back end lapping process occurs after all layers in the read head and overlying write head are formed in combined read/write head structure. For the purpose of more clearly defining the process flow in this disclosure, the eventual ABS is illustrated as a reference point.

Figure 4B:
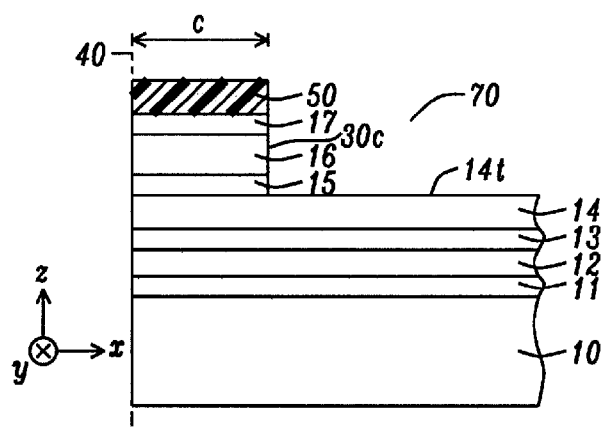

In FIG. 4b, photoresist layer 50 is used as an etch mask during a reactive ion etch (RIE) or ion beam etch (IBE) that removes portions of layers 15-17 not protected by the etch mask. As a result, back end 30c is defined by the opening 70 that preferably stops on a top surface 14t of the PL2 pinned layer.

Figure 4C:
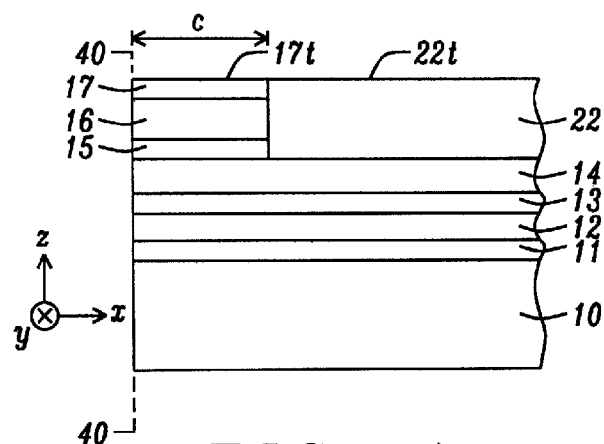

Referring to FIG. 4c, isolation layer 22 is deposited to at least partially fill the opening defined in the previous step. Minimum thickness of the isolation layer is defined as the thickness necessary to provide electrical separation between back end 30c and a subsequently deposited stack including a AFM layer. In the exemplary embodiment, isolation layer has a thickness such that top surface 22t is substantially coplanar with a top surface 17t of the capping layer.

Figure 4D:
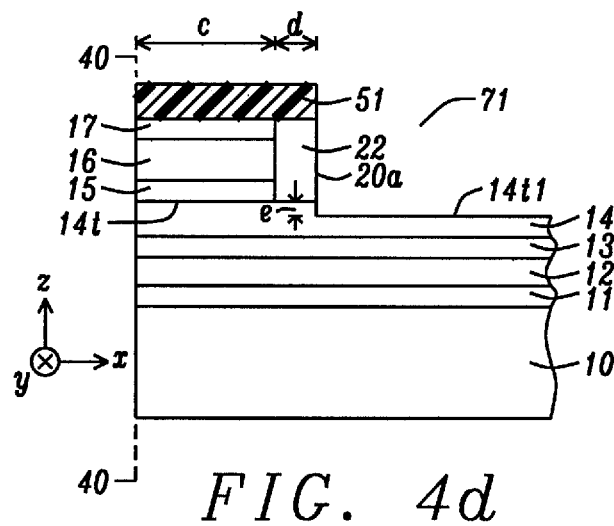

In FIG. 4d, a second photoresist layer is formed on top surfaces 17t, 22t and is patternwise exposed to generate a photoresist mask layer 51 that covers the top surface of capping layer 17 and extends a distance d beyond first stripe height c. A second RIE or IBE process is performed to remove portions of isolation layer 22 that are not protected by the photoresist mask. The etching step may remove an upper portion of layer 14 that is not protected by the photoresist mask and stops at a distance e below top surface 14t to form a top surface 14t1 along a back portion of the PL2 pinned layer that represents the bottom of opening 71.

Figure 4E:
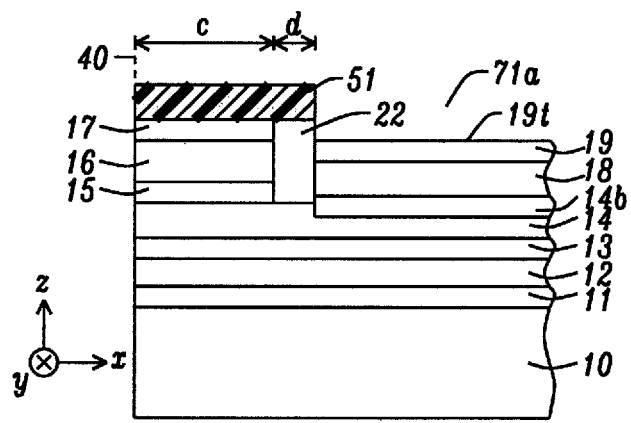

With regard to FIG. 4e, photoresist layer 51 remains in place while the third stack of layers (14b, 18, 19) is deposited. Preferably, the third stack does not completely fill opening 71 so that a small space 71a remains between a top surface 19t of capping layer 19 and top surface 17t of the capping layer 17.

Figure 4F:
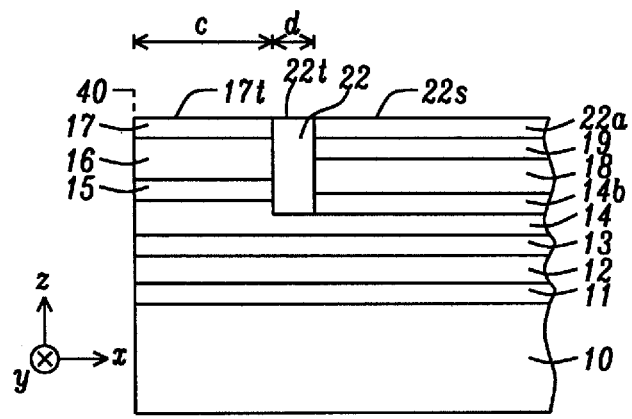

Thereafter, in FIG. 4f, a second isolation layer 22a is deposited and a chemical mechanical polish (CMP) process may be performed to form a top surface 22s of the second isolation layer that is substantially coplanar with top surface 17t.

Next, another photoresist patterning and etch sequence is performed to generate a back side 20b with first stripe height h (shown in FIG. 3a). Another isolation layer 23 (FIG. 3a) is typically deposited behind back side 20b to complete the MR sensor structure. Note that the dielectric material used in isolation layers 22a, 23 may be the same as in isolation layer 22.

The present disclosure also encompasses an annealing step after all layers in the MR sensor structure have been deposited. An annealing process may be performed to set the magnetization direction of the PL1 pinned layer 14b and PL2 pinned layer 14 by heating the patterned MR sensor to a temperature range of 200° C. to 350° C. while applying a magnetic field along the x-axis direction.

Figure 5A:
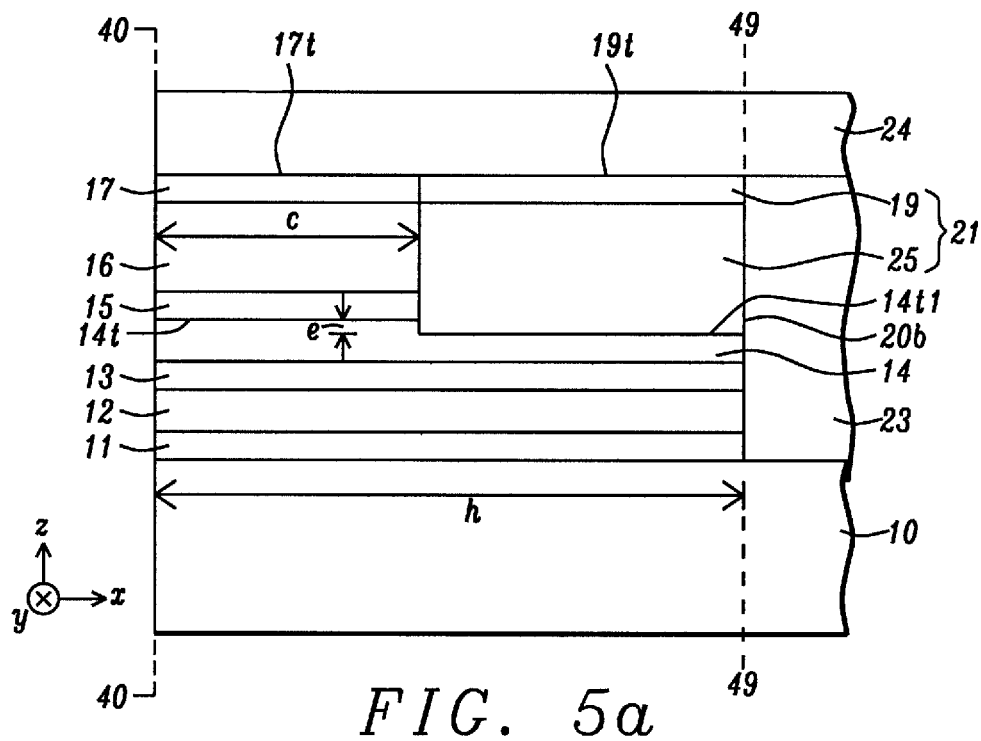
FIGS. 5a-5b are down-track cross-sectional views of embodiments where the PL1 pinned layer/AFM stack of the embedded AFM design is partially or entirely replaced by a single oxide AFM layer that adjoins a back side of the free layer.

Referring to FIG. 5a, another embodiment of the present disclosure is shown wherein AFM layer 18 in the third stack of the previous embodiment is replaced by an oxide AFM layer 25 such as NiO or the like. In this case, the second capping layer 19 that contacts a top surface of the oxide AFM layer may have a top surface 19t that is coplanar with top surface 17t of the first capping layer 17. There is no need to electrically isolate the oxide AFM layer from top shield 24 which means top surface 19t of the second capping layer may contact bottom surface 24t of the top shield. Furthermore, a front side of the oxide AFM layer may adjoin a back side of the second stack since there is no longer a need for a gap layer made of a dielectric material between the second stack and third stack. In the exemplary embodiment, oxide AFM layer 25 is partially embedded in a back portion of PL2 layer 14 such that top surface 14t is a greater distance from bottom shield than top surface 14t1 that is formed below the third stack 21. Here, the third stack extends a distance (h-c) from back side 30c of second stack to back side 20b that is shared with the first stack. Back side 20b is formed along vertical plane 49-49. By embedding the oxide AFM layer into a back portion of PL2 pinned layer, a greater pinning strength is achieved.

Figure 5B:
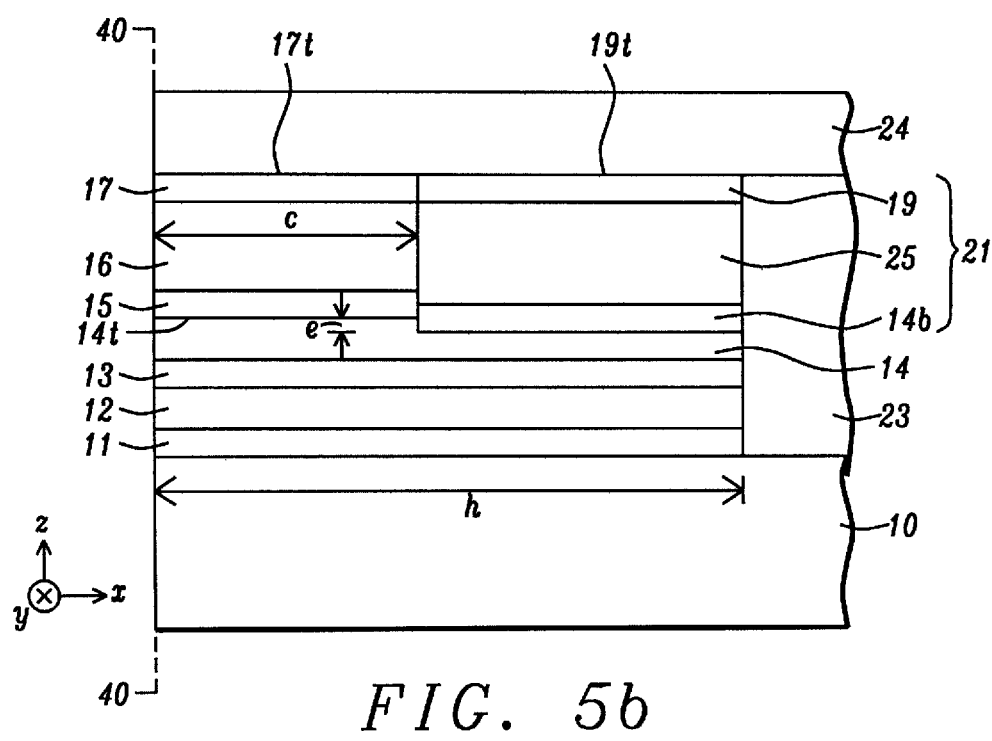

In FIG. 5b, another embodiment is illustrated where third stack 21 in FIG. 5a is modified to further include a PL1 pinned layer 14b between oxide AFM layer 25 and PL2 pinned layer 14. In this case, the PL1 pinned layer is embedded by a distance e into the PL2 pinned layer to improve pinning strength and stability. Other features related to the third stack in FIG. 5a are maintained including a common back side 20b of the first stack and third stack, and all layers in the third stack adjoin a back side 30c of the first stack.

Figure 6A:
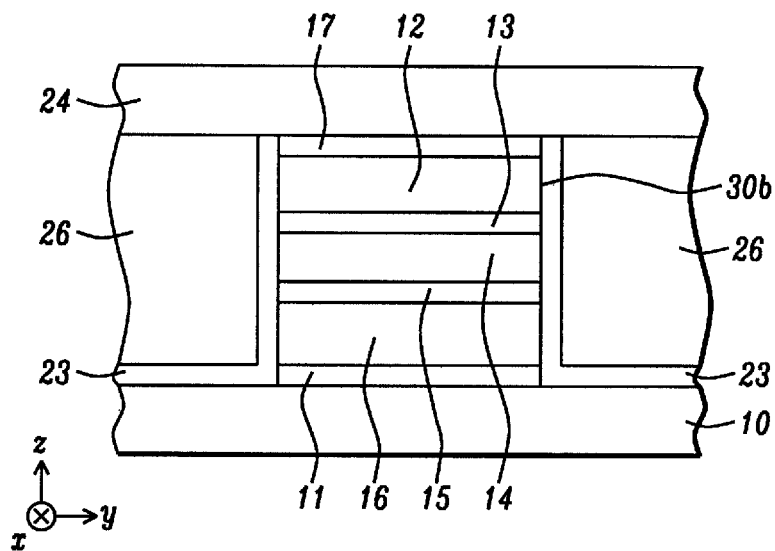
FIG. 6a and FIGS. 6b-6c are ABS, and down-track cross-sectional views, respectively, of a top spin valve embodiment of an embedded AFM design according to an embodiment of the present disclosure.

The present disclosure also anticipates that the AFM refill design of the first embodiment may be incorporated in a MR sensor with a top spin valve configuration. In FIG. 6a, an ABS view of a MR sensor with a top spin valve structure is shown between a bottom shield 10 and top shield 24. Seed layer 11, free layer 16, non-magnetic spacer 15, PL2 pinned layer 14, coupling layer 13, reference layer 12, and capping layer 17 are sequentially formed on the bottom shield. Similar to the MR sensor with bottom spin valve configuration, an isolation layer 23 is formed adjacent to sidewalls 30b, and hard bias layers 26 are formed on either side of the free layer for a biasing effect. In this embodiment, all layers 11-17 may have a similar width in a cross-track direction when sidewalls 30b are substantially vertical. However, the present disclosure also anticipates that the cross-track width of a second stack of layers 12-14 and 17 may be greater than a cross-track width of a first stack of layers 14b1, 15, and 16.

Figure 6B:
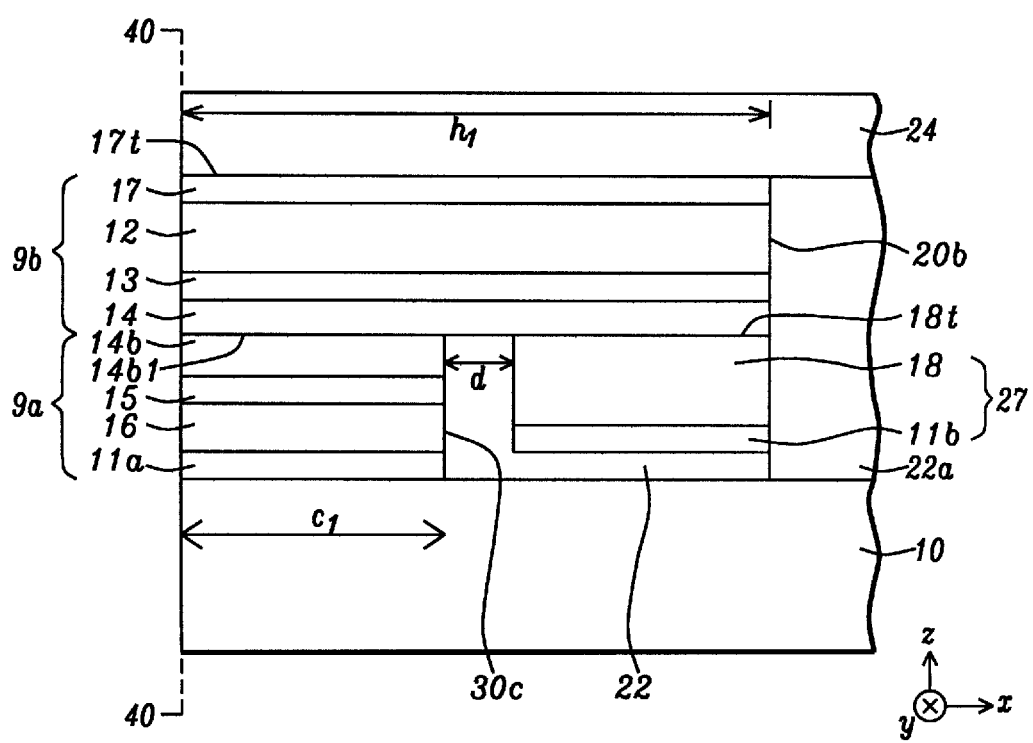

Referring to FIG. 6b, a down-track cross-sectional view is depicted of the top spin valve design in FIG. 6a. In this case, a first stack 9c comprises a bottommost seed layer 11a that is disposed on bottom shield 10. Free layer 16, non-magnetic spacer 15, and PL1 pinned layer 14b are sequentially formed on seed layer 11a to complete the first stack. Each layer in the first stack has a first stripe height $c_1$. Isolation layer 22 is formed on the bottom shield behind first stack back side 30c at a distance from the ABS that is greater than the first stripe height. Recessed behind the first stack by a gap distance d is a third stack 27 including a lower seed layer 11b and an upper AFM layer 18 with a top surface 18t that is preferably coplanar with top surface 14t of the PL1 pinned layer. Above the first stack is second stack 9d wherein PL2 pinned layer 14, coupling layer 13, reference layer 12, and capping layer 17 are sequentially deposited on top surface 14t, isolation layer 22, and top surface 18t. Each layer in the second stack has a second stripe height $h_1$ that is greater than $c_1$. Preferably, the second stack shares a common back side 20b with the third stack. Isolation layer 22a may adjoin back side 20b. Although the AFM layer is positioned below a back portion of the PL2 pinned layer, the morphology of the front portion of the PL2 pinned layer above the first stack is not affected by the AFM layer. Moreover, the RSS distance is reduced because the AFM layer is recessed behind the first stack while still providing substantial pinning strength with the PL2 pinned layer. In this embodiment, the PL1 pinned layer is included in the first stack with the free layer in order to provide better coupling and stability.

Figure 6C:
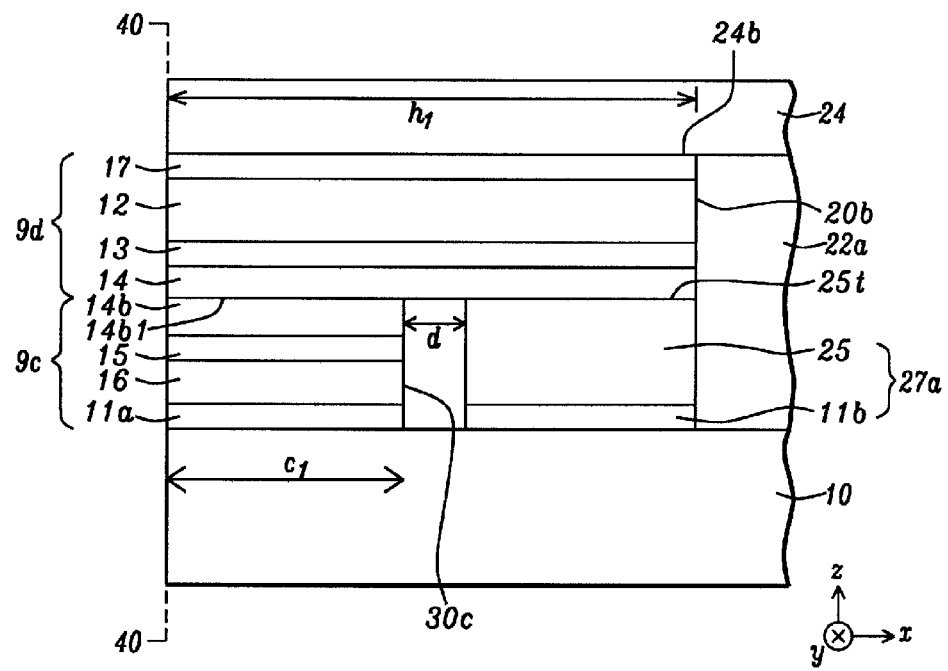

In another embodiment in FIG. 6c, the MR sensor structure of FIG. 6b is modified by replacing the third stack 27 with a lower seed layer 11b and an upper oxide AFM layer 25 as shown by third stack 27a. Seed layer 11b may contact a top surface of bottom shield 10. Furthermore, isolation layer 22 may be omitted such that the third stack of layers adjoins a back side 30c of the first stack. Similar to the previous embodiment in FIG. 6b, the second stack 9d is formed on the top surface 14b1 of the first stack and on a top surface 25t of the third stack. The second stack retains its original configuration from the previous embodiment.

The present disclosure also encompasses an embodiment called an extended embedded AFM design where the AFM layer is embedded in the bottom shield and surrounds the back side and sidewalls of the second stack of layers including the free layer. RSS distance is reduced since the AFM layer is not placed between the top shield and bottom shield at the ABS. Moreover, there is a portion of bottom shield below the second stack such that the portion of pinned layer aligned below the free layer is not influenced by the morphology of the AFM layer that is formed on either side of the bottom shield center section.

Figure 7:
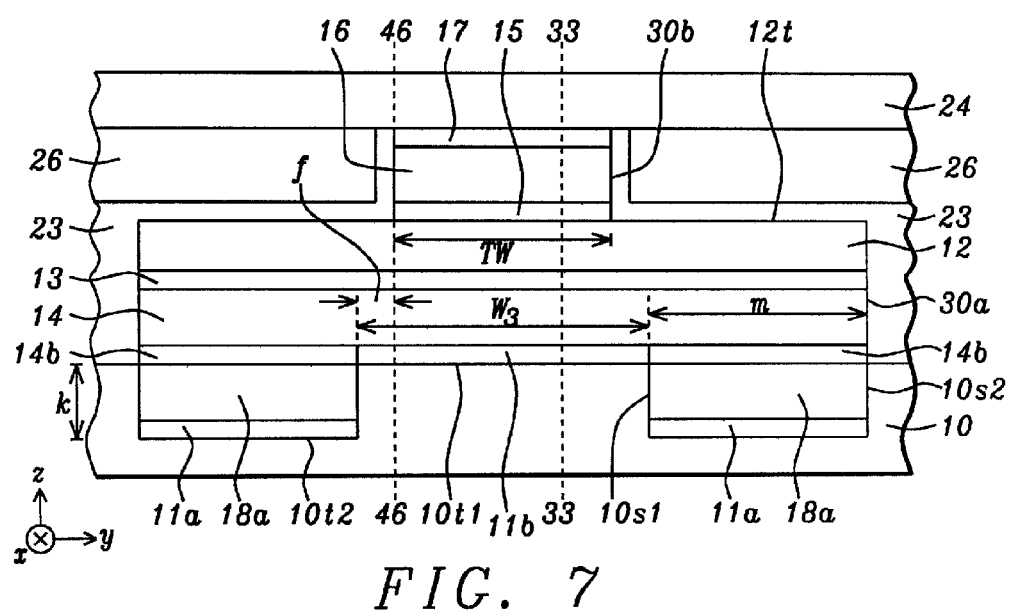
FIG. 7 is an ABS view of an embodiment of the present disclosure wherein an AFM layer is embedded in a bottom shield and wraps around a back side of the free layer portion of the MR sensor in an extended embedded AFM design.

Referring to FIG. 7, an ABS cross-sectional view is shown of one extended embedded AFM layout where a third stack of layers comprising a lower seed layer 11a and an overlying AFM layer 18a fills a trench on either side of bottom shield center section having top surface 10t1 and cross-track width $w_3$. In other words, the third stack has two side sections each with a thickness k in a down-track direction, a width m in a cross-track direction, and having a bottom surface adjoining top surface 10t2 of bottom shield side sections on either side of the bottom shield center section. Thus, a top surface of each AFM layer is coplanar with top surface 10t1.

Above AFM layer 18a on either side of the bottom shield center section is a PL1 pinned layer 14b having a width m and that shares a common outer sidewall 10s2 with the AFM layer and underlying lower seed layer 11a. A top surface of the PL1 pinned layer may be coplanar with a second seed layer 11b formed on top surface 10t1. Accordingly, the PL1 pinned layer may be considered an uppermost layer in the third stack of layers. Preferably, the second seed layer has a width $w_3$ equal to that of the bottom shield center section. Seed layers 11a, 11b may be selected from the same materials as previously described with respect to seed layer 11. A first stack of layers including PL2 pinned layer 14, coupling layer 13, and reference layer 12 are sequentially formed on second seed layer 11b and on the PL1 pinned layer. In a preferred embodiment, the first stack has a sidewall 30a that is formed along the same vertical plane as sidewall 10s2 of the third stack. Isolation layer 23 adjoins sidewall 10s2 and sidewall 30a.

A second stack of layers comprising a lower non-magnetic spacer 15, middle free layer 16, and upper capping layer 17 is formed on a top surface of the reference layer and is aligned above the second seed layer 11b and has a track width TW that is less than $w_3$. As a result, there is an offset or gap f in a cross-track direction between an inner sidewall 10s1 of the third stack and a vertical plane 46-46 that includes sidewall 30b of the second stack. Isolation layer 23 preferably is formed on a top surface 12t of the reference layer 12 that is not covered by the second stack and adjoins sidewalls 30b. A hard bias layer 26 is formed in the isolation layer above top surface 12t and adjacent to free layer 16 in order to bias the free layer magnetization (not shown) in a cross-track direction. Top shield 24 contacts a top surface of the capping layer and may also contact a top surface of the hard bias layers.

Figure 8A:
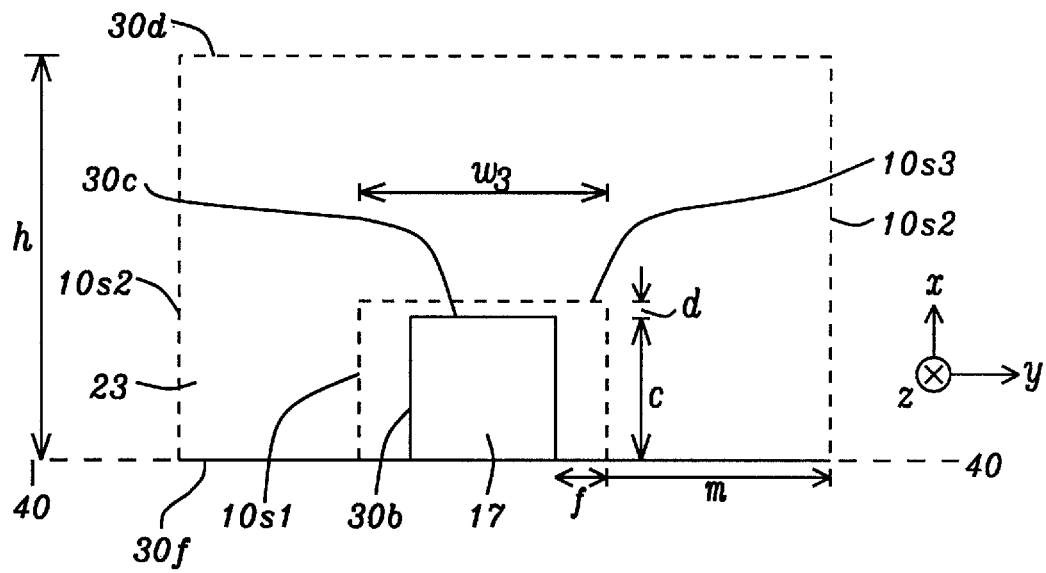
FIGS. 8a-8b are top-down views of two embodiments of the extended embedded AFM design structure in FIG. 7.

From a top-down view in FIG. 8a with top shield and hard bias layers removed, the extended embedded AFM design has a continuous stripe comprised of a lower seed layer and middle AFM layer, and upper PL1 layer (not shown) formed parallel to second stack sidewalls 30b and that wraps around the back side 30c of the second stack that has capping layer 17 as the uppermost layer. According to one embodiment, the extended embedded AFM structure has a third stack with two side sections having cross-track width m that extend from front end 30f to a height (c+d) from the ABS, and a back section with a rectangular shape that connects the two side sections. The back section has a cross-track width equal to $2m+w_3$ and extends a height [h−(c+d)] between front side 10s3 and back side 30d. There is a gap d between second stack back side 30c and front side 10s3 of the third stack back section. Note that inner sidewalls 10s1 from the two side sections are connected by a front side 10s3 of the back section behind the second stack. There is an offset or gap distance f depicted between second stack sidewall 30b and inner sidewall 10s1. Offset f may be increased to improve bottom shield stability or decreased to enhance pinning strength. Back side 30d of the third stack may coincide with a back side of the first stack. The extended embedded AFM design provides a larger area of AFM coupling to the PL2 pinned layer through the PL1 pinned layer, and enables AFM pinning to occur from behind the free layer and along free layer sidewalls.

Figure 8B:
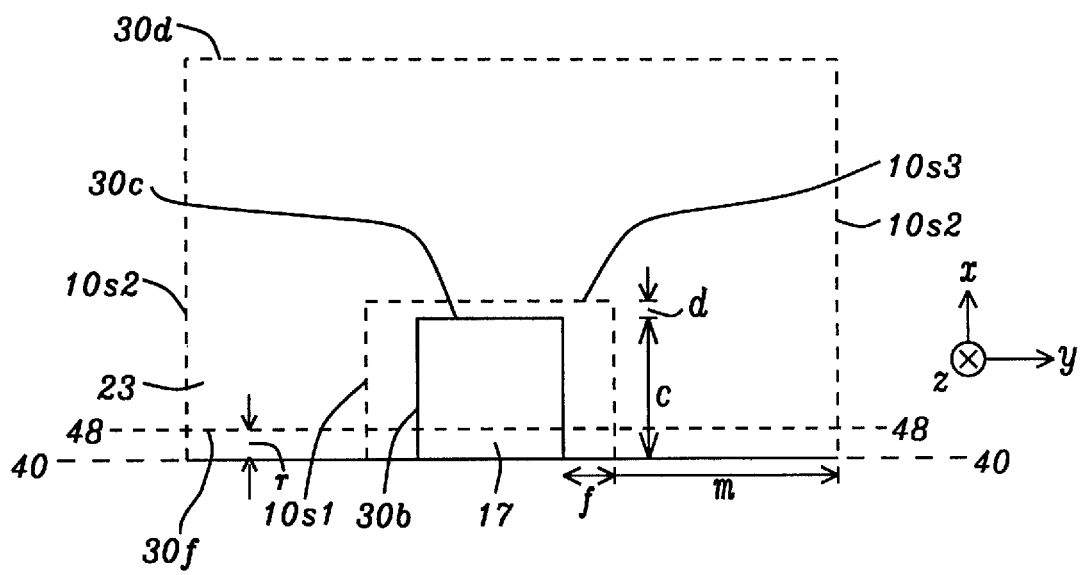

In another embodiment shown in FIG. 8b, a front side 30f of the third stack comprising AFM layer 18a, seed layer 11a, and PL1 layer 14b may be recessed from the ABS 40-40 along a plane 48-48 that is a distance r up to about 10 nm from the ABS. All other features are retained from the embodiment in FIG. 8a. Therefore, the height of each third stack side section is equal to [h−(c+d)−r]. Although there is slightly less pinning strength between the AFM layer and PL2 pinned layer 14 because of the shorter stripe height of the third stack side sections, an advantage of this embodiment is that the AFM layer is not exposed at the ABS.

Figure 9A:
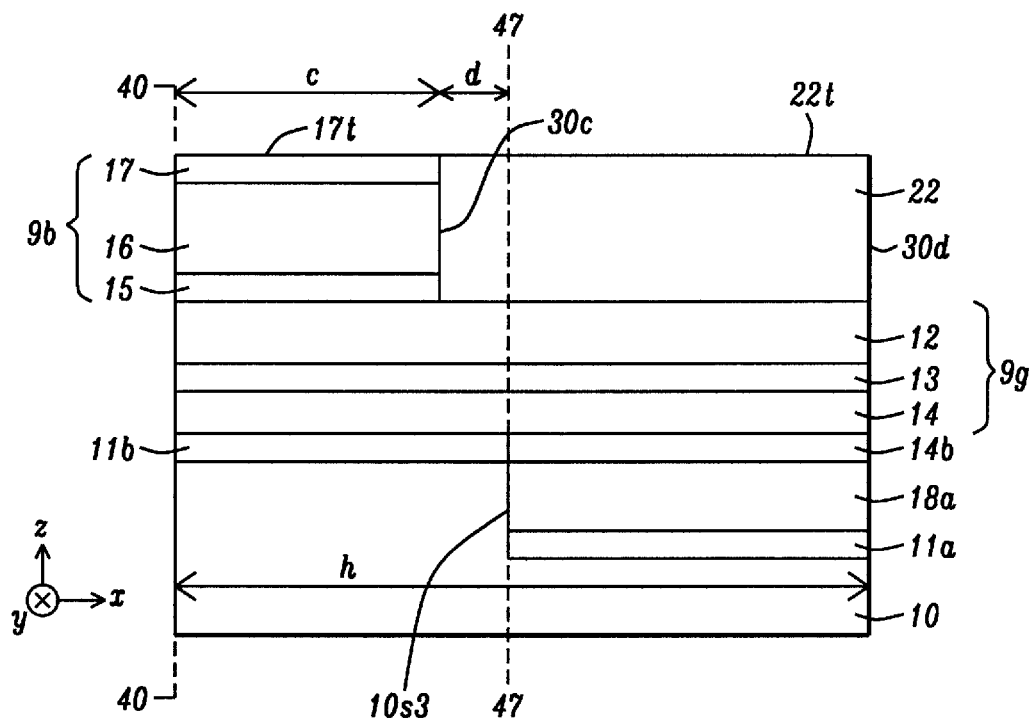
FIGS. 9a-9b are down-track cross-sectional views of two embodiments of the extended embedded AFM structure in FIGS. 7-8.

A down-track cross-sectional view of the extended embedded AFM design is shown in FIG. 9a and is taken along center plane 33-33 in FIG. 7 that applies to the embodiment in FIG. 8a where a front side of the third stack abuts the ABS. In the exemplary embodiment, the first stack 9g has a first stripe height h between ABS 40-40 and back side 30d. The second stack 9b has a second stripe height c and a back side thereof is separated from a vertical plane 47-47 that includes third stack front side 10s3 by the gap distance d. In this layout, isolation layer 22 adjoins back side 30c and extends to back side 30d above a back portion of reference layer 12. Top surface 22t of the isolation layer is preferably coplanar with top surface 17t of the first capping layer 17.

Figure 9B:
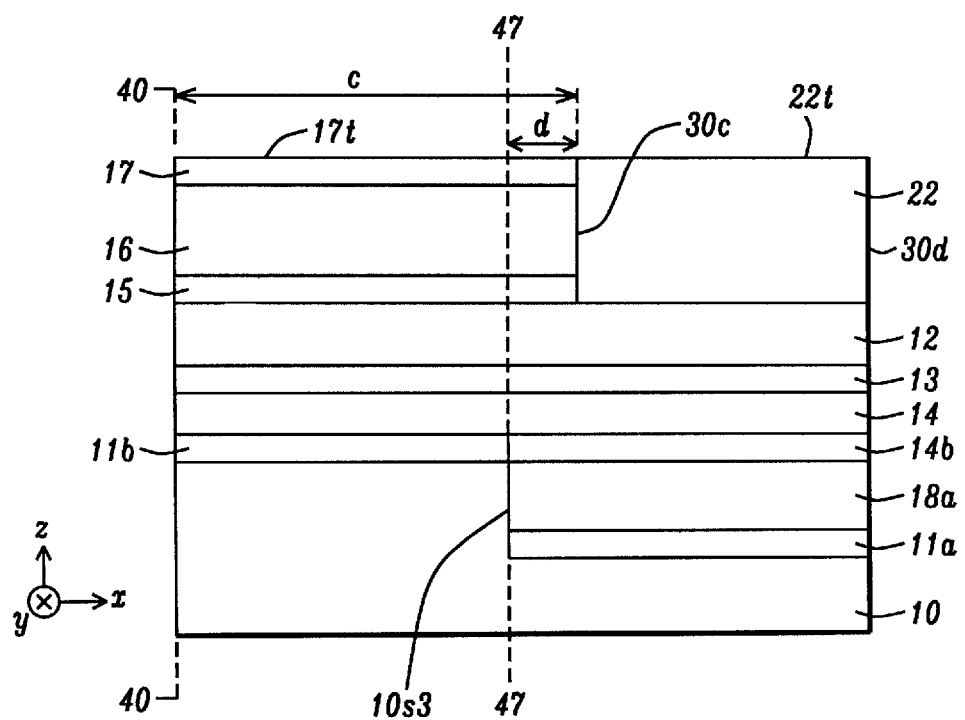

An alternative embodiment is depicted in FIG. 9b where the MR sensor structure is retained from FIG. 9a except the vertical plane 47-47 including front side 10s3 is formed closer to the ABS 40-40 than second stack back side 30c. In other words, a back portion of the second stack of layers 15-17 is aligned above the third stack front side 10s3 and thereby allows a higher pinning strength between AFM layer 18a and PL2 pinned layer 14 through PL1 pinned layer 14b.

Figure 10A:
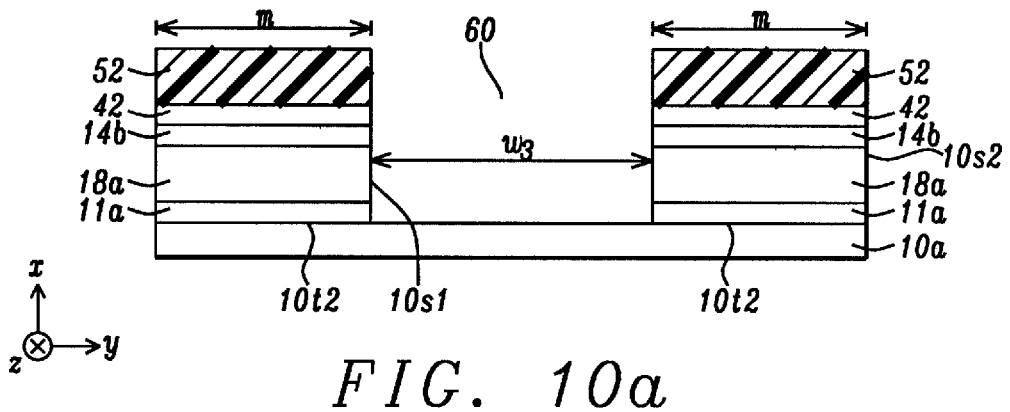
FIGS. 10a, 10b, 10d, and 10e are ABS views.

FIGS. 10a-10e relate to a process sequence for fabricating the extended embedded AFM design depicted in FIG. 7. In FIG. 10a, a first bottom shield layer 10a is deposited with top surface 10t2. Then, seed layer 11a, AFM layer 18a, PL1 pinned layer 14b, and capping layer 42 are sequentially deposited on the first bottom shield layer. Capping layer 42 may be comprised of one or both of Ta and Ru, or may be an oxide as described earlier with respect to capping layer 17. Thereafter, a photoresist layer is coated and patternwise exposed to form a photoresist mask layer 52 having a cross-track width m on opposite sides of an opening 60. Inner sidewalls 10s1 and outer sidewalls 10s2 are formed after a conventional etch process removes portions of layers 11a, 18a, 14b, and 42 that are not protected by the photoresist mask layer. Opening 60 has a width $w_3$ in a cross-track direction and is formed between the inner sidewalls, and has a bottom surface that coincides with top surface 10t1 in FIG. 7.

Figure 10B:
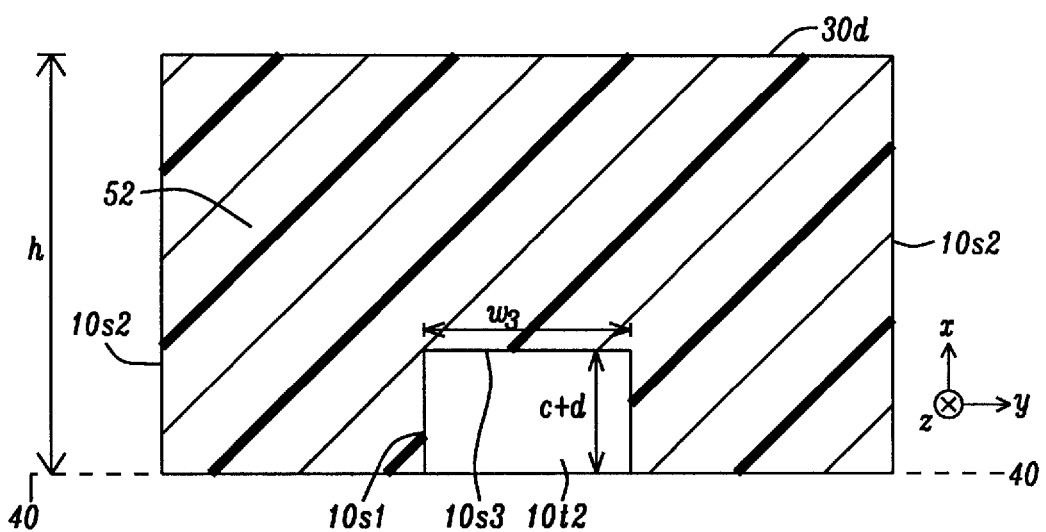

Referring to FIG. 10b, a top-down view of the photoresist mask layer 52 from FIG. 10a is shown. In the exemplary embodiment, the distance between the ABS 40-40 and the front side 10s3 of the back section is (c+d). Opening 60 has a width $w_3$ and uncovers a portion of top surface 10t2 between inner sidewalls 10s1. Back side 30d is formed a first stripe height distance h from the ABS.

Figure 10C:
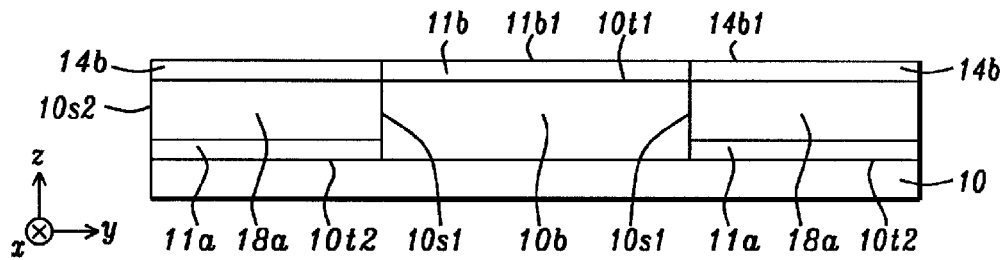
FIG. 10c is a top-down view depicting various intermediate structures during the fabrication of an extended embedded AFM design that is shown in FIG. 7.

Referring to FIG. 10c, a center bottom shield section 10b is deposited to partially fill opening 60 and then the second seed layer 11b is deposited on a top surface of the bottom shield center section. The thickness of the second seed layer may vary and may not necessarily be equivalent to a thickness of adjacent pinned layer 14b. A chemical mechanic polish (CMP) process may be performed to remove cap layer 42 and photoresist mask 52 to leave a substantially planar top surface comprised of second seed layer top surface 11b1 and PL1 pinned layer top surface 14b1. Bottom shield center section 10b is preferably made of the same magnetic material as first bottom shield layer 10a, and together they are depicted as a single bottom shield layer 10 in FIG. 7 and FIG. 10d.

Figure 10D:
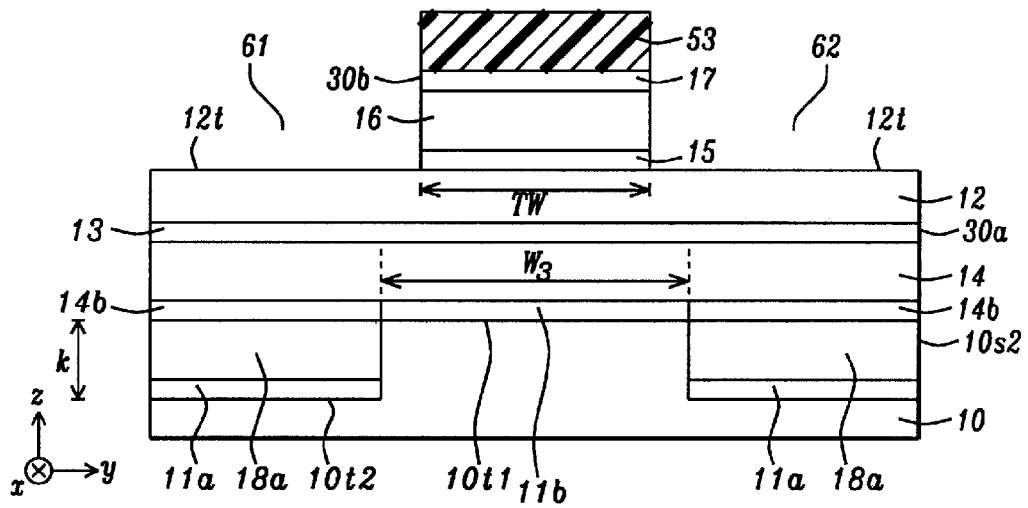

With regard to FIG. 10d, the first stack of layers 12-14 is deposited on top surfaces 11b1, 14b1 and is patterned by a conventional process to form sidewalls 30a. A lower portion of isolation layer 23 (FIG. 7) may then be formed adjacent to sidewalls 30a. Next, the second stack of layers 15-17 is deposited and patterned to form sidewalls 30b on top surface 12t by conventional processes.

Figure 10E:
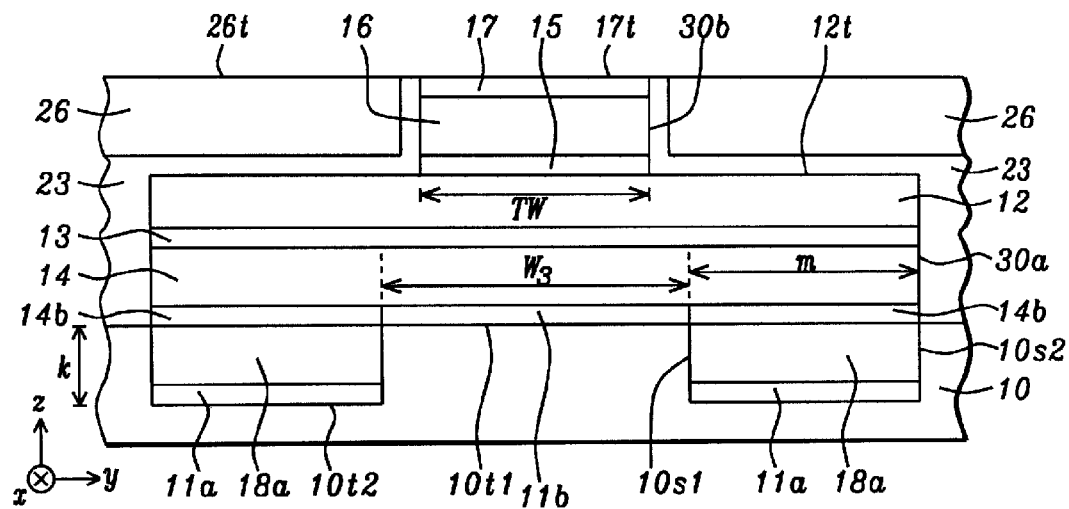

Referring to FIG. 10e, a top portion of the isolation layer 23 may then be deposited on top surface 12t and along sidewalls 30b. Thereafter, hard bias layer 26 is formed within the top portion of isolation layer and adjacent to free layer 16 by a well known process. Another CMP process may be performed to remove the photoresist mask layer 53 and form a planar top surface that includes capping layer top surface 17t and top surface 26t of the hard bias layers. Conventional processing is followed to fabricate a top shield and will not be described here.

The MR sensors described in the various embodiments of this disclosure are readily manufacturable since all of the steps utilize materials and processes already recognized as being acceptable for high throughput fabrication schemes. All embodiments take advantage of a MR sensor structure wherein the AFM layer is either recessed behind the free layer or embedded in the bottom shield so that reader shield spacing may be reduced to enable higher areal density and lower BER required for shrinking sensor sizes. Meanwhile, pinning strength with the pinned layer is retained and even improved with the use of a PL1 pinned layer between the PL2 pinned layer and AFM layer, and with an extended embedded AFM design where there is an increased area of contact between the AFM and pinned layer to improve MR sensor stability. A morphology (roughness) effect on the pinned layer is avoided since the AFM layer is either formed above the PL1/PL2 pinned layer in some embodiments, or formed below a portion of the pinned layer that is not aligned beneath the free layer in other embodiments. Thus, tunnel barrier (non-magnetic layer) flatness is improved and reader stability is enhanced. Moreover, the MR sensor designs of the present disclosure are compatible with bottom spin valve and top spin valve configurations.

While this disclosure has been particularly shown and described with reference to, the preferred embodiment thereof, it will be understood by those skilled in the art that various changes in form and details may be made without departing from the spirit and scope of this disclosure.

We claim:

1. A read head including a magnetoresistive (MR) sensor, comprising:
  (a) a bottom shield having a top surface;
  (b) a first stack of layers including a seed layer contacting the bottom shield top surface, and a reference layer (RL), coupling layer, and PL2 pinned layer (PL2) in a seed layer/RL/coupling layer/PL2 configuration, the first stack has a first set of two sidewalls extending a first height from an air bearing surface (ABS), a first width in a cross-track direction, and a back side at the first height distance;
  (c) second stack of layers including a non-magnetic spacer, free layer, and a first capping layer that are sequentially formed on a top surface of a PL2 front portion, the second stack has a track width in a cross-track direction, a second set of two sidewalls that extend a second height less than the first height from the ABS, and a back side connecting the second set of two sidewalls; and
  (d) a third stack of layers comprising an antiferromagnetic (AFM) layer that pins a magnetization direction in the PL2 layer, the third stack is formed on a top surface of a PL2 back portion that is a certain distance below the top surface of the PL2 front portion, and the third stack has a front side facing the second stack back side wherein the third stack front side is at least a second height distance from the ABS and has a cross-track width greater than the track width, the third stack has a back side formed along a vertical plane in a down-track direction where the vertical plane includes the first stack back side.

2. The read head of claim 1 further comprising an isolation layer that forms a gap of up to 50 nm between the second stack back side and the third stack front side, the isolation layer also extends above a top surface of the third stack.

3. The read head of claim 2 wherein the third stack comprises a lower PL1 pinned layer (PL1), a middle AFM layer that is a Mn alloy, and an upper second capping layer in a PL1/AFM/capping layer configuration, the PL1 layer contacts the PL2 layer in the first stack between the third stack front side and the third stack back side.

4. The read head of claim 3 wherein a top surface of the PL2 back portion is formed a distance up to about 20 Angstroms below the top surface of the PL2 front portion.

5. The read head of claim 2 wherein the third stack comprises a lower AFM layer, and an upper second capping layer in an AFM/second capping layer configuration, the AFM layer contacts the PL2 layer in the first stack between the third stack front side and the third stack back side, and has a bottom surface that is formed below a top surface of the PL2 front portion.

6. The read head of claim 1 wherein the first width of the first stack is essentially equal to the track width.

7. The read head of claim 1 wherein the first width of the first stack is substantially greater than the track width.

8. The read head of claim 1 wherein the third stack has a trapezoidal shape from a down-track perspective such that the cross-sectional width of the third stack front side is less than a cross-sectional width of the third stack back side.

9. The read head of claim 1 wherein the third stack has a lower oxide AFM layer and an upper second capping layer, the front side of the third stack adjoins a back side of the second stack, and a bottom surface of the oxide AFM layer is formed a distance up to about 20 Angstroms below a top surface of the PL2 front portion.

10. The read head of claim 1 wherein the third stack comprises a lower PL1 pinned layer (PL1), a middle oxide AFM layer, and an upper second capping layer in a PL1/oxide AFM/capping layer configuration, the PL1 layer contacts the PL2 layer in the first stack between the third stack front side and the third stack back side.

11. The read head of claim 1 further comprising a top shield that contacts a top surface of the first capping layer in the first stack, and is formed on the third stack.

12. A read head including a magnetoresistive (MR) sensor with a top spin valve configuration, comprising:
(a) a bottom shield having a top surface;
(b) a first stack of layers including a seed layer contacting the bottom shield top surface, and a free layer (FL), non-magnetic spacer, and first pinned layer (PL1) in a seed layer/FL/non-magnetic spacer/PL1 configuration, the first stack has a first set of two sidewalls extending a first height from an air bearing surface (ABS), a track width in a cross-track direction, and a back side at the first height distance;
(c) a second stack of layers including a second pinned layer (PL2), coupling layer, reference layer (RL), and first capping layer that are sequentially formed on a top surface of the PL1 layer, the second stack has a first width in a cross-track direction, a second set of two sidewalls that extend a second height greater than the first height from the ABS, and a back side connecting the second set of two sidewalls; and
(d) a third stack of layers comprising an antiferromagnetic (AFM) layer that pins a magnetization direction in the PL2 layer, the third stack has a front side that is recessed at least a first height distance from the ABS and that faces the first stack back side, and the third stack has a back side formed along a vertical plane in a down-track direction where the vertical plane includes the second stack back side.

13. The read head of claim 12 further comprising an isolation layer that forms a gap between the first stack back side and the third stack front side, the isolation layer also separates the third stack from the bottom shield top surface.

14. The read head of claim 13 wherein the third stack comprises a lower second seed layer, and an upper AFM layer that is a Mn alloy, the AFM layer has a top surface that contacts a bottom surface of a back portion of the PL2 layer which is greater than a first height distance from the ABS, and is formed coplanar with a top surface of the PL1 layer.

15. The read head of claim 12 wherein the third stack comprises a lower second seed layer, and an upper oxide AFM layer, the second seed layer contacts the bottom shield top surface, and a top surface of the upper oxide AFM layer is formed coplanar with a top surface of the PL1 layer.

16. The read head of claim 15 wherein the third stack front side adjoins the first stack back side.

17. A read head including a magnetoresistive (MR) sensor, comprising:
(a) a bottom shield with a center section having a top surface, and two side sections formed on opposite sides of the bottom shield center section at an air bearing surface (ABS) and separated by a first width, the two side sections have a top surface formed a first distance in a down-track direction below the bottom shield center section top surface;
(b) a first stack of layers including a first seed layer contacting the top surface of each bottom shield side section, a middle antiferromagnetic (AFM) layer, and an upper first pinned layer (PL1), the first stack forms a continuous stripe around two sidewalls and back side of an overlying third stack and is comprised of two side portions that connect to a back portion, each side portion has a second width in a cross-track direction, an outer sidewall that connects to a first stack back side at a first height from the ABS, and and an inner sidewall that connects to a front side of the back portion at a second height from the ABS;
(c) a second stack of layers including a second pinned layer (PL2) that contacts a PL1 layer top surface, a coupling layer, and reference layer (RL), the second stack has two sidewalls that each share a vertical plane with a first stack outer sidewall and extend a first height from the ABS; and
(d) the overlying third stack of layers aligned above the bottom shield center section and comprising a non-magnetic spacer contacting a top surface of the reference layer, a middle free layer, and an upper capping layer, the third stack has a track width less than the first width, and the two sidewalls that extend to a back side thereof formed a third height from the ABS.

18. The read head of claim 17 wherein the two side portions of the first stack each have a front side at the ABS.

19. The read head of claim 17 wherein the two side portions of the first stack each have a front side that is recessed from the ABS.

20. The read head of claim 17 wherein the third height is less than the second height.

21. The read head of claim 17 wherein the third height is greater than the second height.

22. The read head of claim 17 wherein an isolation layer is formed between the third stack back side and the vertical plane that is shared by the first stack back side and second stack back side.

23. The read head of claim 17 wherein the middle AFM layer is made of a Mn alloy.

24. The read head of claim 17 further comprised of an isolation layer formed along the third stack sidewalls and on a top surface of the second stack, and a hard bias layer formed within the isolation layer and adjacent to each third stack sidewall.

25. The read head of claim 17 further comprised of a second seed layer that contacts a top surface of the bottom shield center section between the first stack side portions, the second seed layer has a top surface that is coplanar with a top surface of the PL1 layer.

26. A method of fabricating a magnetoresistive (MR) sensor wherein an antiferromagnetic (AFM) layer is recessed a certain distance from an air bearing surface (ABS) in order to reduce reader shield spacing, comprising:
(a) providing a bottom shield and sequentially forming a seed layer, reference layer, coupling layer, pinned layer (PL2), non-magnetic spacer, free layer, and a first capping layer on a top surface of the bottom shield;

(b) etching through portions of the first capping layer, free layer, and non-magnetic spacer to form a first stack that extends a first height from the ABS;
(c) depositing a first isolation layer along a back side of the first stack, the first isolation layer covers a top surface of the PL2 layer that is greater than a first height distance from the ABS;
(d) etching through the first isolation layer except a portion that is within a gap distance of the first stack back side, the etching continues through a back portion of the PL2 layer and stops a first distance below a top surface of a front portion of the PL2 layer to form an opening; and
(e) filling the opening with a second stack of layers including a lower pinned layer (PL1), an AFM layer, a second capping layer, and a second isolation layer such that a top surface of the second isolation layer is substantially coplanar with a top surface of the first capping layer.

27. The method of claim 26 wherein the first distance has a maximum value of about 20 Angstroms.

28. The method of claim 26 further comprised of forming a back side to the MR sensor along a vertical plane that is parallel to the ABS wherein a third stack of layers comprising the seed layer, reference layer, coupling layer, and PL2 layer has a back side that is a second height from the ABS, the second height is greater than a sum of the first height and the gap distance.

29. The method of claim 28 further comprised of forming a back side on the second stack of layers such that the second stack back side and third stack back side are formed along the vertical plane.

30. The method of claim 28 wherein sidewalls are formed along the first stack and third stack after the second stack is formed by filling the opening, the first stack has a track width equal to a cross-track width of the third stack.

31. The method of claim 28 wherein sidewalls are formed along the first stack and third stack after the second stack is formed by filling the opening, the first stack has a track width less than a cross-track width of the third stack.

32. The method of claim 31 wherein the second stack has a trapezoid shape from a top-down view, the trapezoid shape has a front side facing the ABS with a cross-sectional width greater than a track width of the first stack.

33. A method of fabricating a MR sensor wherein an antiferromagnetic (AFM) layer is embedded in a bottom shield in order to reduce reader shield spacing, comprising:
    (a) providing a first bottom shield layer and sequentially forming a first seed layer, AFM layer, first pinned layer (PL1), and a first capping layer on a top surface of the first bottom shield layer;
    (b) etching through portions of the first seed layer, AFM layer, PL1 layer, and first capping layer to form a first stack with two side sections each having an inner sidewall that extends to a front side of a back section at a first height from an air bearing surface (ABS), and an outer sidewall that extends to a back side of the back section at a second height from the ABS, the two side sections are separated by an opening having a first width in a cross-track direction and each has side section has a second width in a cross-track direction;
    (c) depositing a second bottom shield layer that is a bottom shield center section and an overlying second seed layer to fill the opening, and performing a planarization process so that the second seed layer top surface is essentially coplanar with a top surface of the PL1 layer;
    (d) sequentially forming a second pinned layer (PL2), coupling layer, reference layer, non-magnetic spacer, free layer, and second capping layer on the top surface of the second seed layer and PL1 layer;
    (e) etching through portions of the non-magnetic spacer, free layer, and second capping layer to form a second stack of layers having a non-magnetic spacer/free layer/ second capping layer configuration with a track width between two sidewalls that extend a third height from the ABS to a back side thereof; the track width is less than the first width, the second stack is aligned above the bottom shield center section; and
    (f) forming sidewalls and a back side on the reference layer, coupling layer, and PL2 layer to form a third stack with a reference layer/coupling layer/PL2 layer configuration.

34. The method of claim 33 wherein the third stack sidewalls are formed along a vertical plane that includes the outer sidewalls of the first stack.

35. The method of claim 33 further comprised of forming an isolation layer on a top surface of the reference layer and along the second stack sidewalls, and then forming a hard bias layer within the isolation layer and adjacent to the free layer.

36. The method of claim 33 wherein the third height is greater than the first height.

37. The method of claim 33 wherein the third height is less than the first height.

38. The method of claim 33 wherein the third stack back side is formed along a vertical plane that includes a back side of the first stack back section.

39. The method of claim 33 further comprised of forming a second isolation layer between the second stack back side and the vertical plane that is shared by the first stack back side and third stack back side.

40. The method of claim 33 wherein a front side of the first stack side sections is formed at the ABS.

41. The method of claim 33 wherein a front side of the first stack side sections is recessed from the ABS.

* * * * *